United States Patent Office 3,079,376
Patented Feb. 26, 1963

3,079,376
PREPARATION OF DYESTUFFS AND PIGMENTS
Herman A. Bergstrom, Loudonville, Albany, N.Y., assignor to General Aniline & Film Corporation, New York, N.Y., a corporation of Delaware
No Drawing. Filed Feb. 15, 1957, Ser. No. 640,328
10 Claims. (Cl. 260—192)

This invention relates to improved anthraquinone azoic pigments, and a process of preparing the same.

While many anthraquinone azoic pigments are known in the art, having been disclosed, for example, in U.S. Patent No. 1,924,774, but including pigments made by coupling a diazotized amino anthraquinone with a 3-hydroxy-2-naphtharylide (Napthol-AS type coupler), I have found that improved pigments having particularly good light fastness properties and good shades are obtained by coupling a leuco sulfuric acid ester of the diazo compound obtained by diazotization of a leuco ester of an amino anthraquinone, and preferably a chlorinated amino anthraquinone, with a particular class of 3-hydroxy-2-naphtharylide couplers of the following general formula:

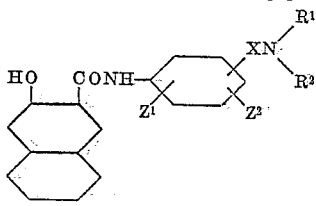

wherein $R^1$, $R^2$, X, $Z^1$ and $Z^2$ are as defined below.

The novel pigments of the present invention may, therefore, be represented by the following general formula:

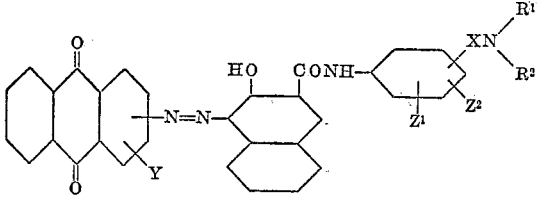

wherein Y represents H and Cl; $R^1$ and $R^2$ each represent H, $C_{1-4}$ alkyl, aryl, or cycloalkyl; and $R^1$ and $R^2$ jointly may represent a mononuclear heterocycle; $Z^1$ and $Z^2$ may represent H, and non-solubilizing substituents such as Br, Cl, $NO_2$, lower alkyl, alkoxy, substituted amino in which the substituents are the same as $R^1$ and $R^2$, acylamido, alkyl and aryl sulfonamido and the like; X represents CO or $SO_2$.

The usual method of preparing anthraquinone-azoic pigments is by diazotization of the amino anthraquinone followed by coupling of the thus obtained diazo with the naphthol AS component to immediately form a pigment. I have found, however, that with the anthraquinone-azoic pigments of the present invention satisfactory products are not obtained by this conventional method since, when so produced, they are dull in shade and are sensitive to alkalies, thus indicating incomplete coupling and a high degree of impurity. I have found, however, that the anthraquinone-azoic pigments of the present invention may be produced in good yield and with good properties if the amino anthraquinone is reduced to the leuco sulfuric acid ester and the diazo of this leuco sulfuric acid ester then formed by conventional diazotization procedures and then coupled with a 3-hydroxy-2-naphtharylide of the type mentioned above. This coupling is effected in known manners and preferably in an alkaline solution, pH 7.5–11. The temperature should be maintained in the range of 0° C. to 5° C. since the diazotized leuco sulfuric acid ester of the amino anthraquinone decomposes readily even at room temperature. The leuco sulfuric acid esters already have the advantage of being comparatively soluble so that complete coupling is readily obtained. The leuco sulfuric acid esters of the anthraquinone-azoic pigments obtained in this manner may be used directly without isolation but in order to obtain higher purity it is preferred to isolate it as by salting out and redissolving in water, about a 1 to 30% solution being preferred. The leuco sulfuric acid esters of the anthraquinone-azoic pigments are then oxidized by the addition of an oxidizing agent to the solution of the same and thus converted to the anthraquinone-azoic pigments. The oxidizing agents which may be employed for oxidation of the leuco sulfuric acid esters may be of the usual oxidizing agents such as hydrogen peroxide, per acids (e.g. persulfuric acid) per sulfates (e.g. sodium persulfate), potassium permanganate, sodium dichromate, ferric chloride and the like. Sodium nitrite is particularly preferred as an oxidizing agent since it is inexpensive, easy to use and leaves no undesirable metallic by-products. The oxidizing agent is used in a calculated equivalent amount of oxidizing agent per leuco to be oxidized, up to about 150% excess. After the addition of the oxidizing agent it is advantageous to warm the reaction mixture for a while, for example from ½ to 5 hours at a temperature range from 60° C. to 90° C. On completion of the oxidation the pigment is filtered, washed and dried in any suitable manner, or, if desired, the pigment can be recovered and used as a paste. In carrying out the oxidation it has been found preferable and advantageous to effect the oxidation in the presence of a small amount of polymeric-N-vinyl-α-pyrrolidone in the manner described in my copending application Serial No. 616,135, filed October 16, 1956.

The amino anthraquinones which I have found to be useful in producing the novel products of the present invention include:

1-aminoanthraquinone
2-aminoanthraquinone
1-amino-2-chloroanthraquinone
1-amino-4-chloroanthraquinone
1-amino-5-chloroanthraquinone
1-amino-6-chloroanthraquinone
2-amino-1-chloroanthraquinone
2-amino-3-chloroanthraquinone Of these the chloro substituted amino anthraquinones are particularly preferred since it has been found that the pigments produced from them have greater light fastness.

The 3-hydroxy-2-naphtharylides of the type indicated above which are useful as coupling components in preparation of the novel pigments of the present invention include those obtained by condensing the acid chloride of 3-hydroxy-2-naphthoic acid with the following amines:

3-aminobenzamide
3-aminobenzanilide
4-aminobenzamide
4-amino-N-methylbenzamide
4-amino-N,N-dimethylbenzamide
4-amino-N,N-diethylbenzamide
4-amino-N-isopropylbenzamide
4-amino-N-butylbenzamide
4-amino-N-cyclohexylbenzamide
4-amino-N,N-dicyclohexylbenzamide
4-amino-N-phenylbenzamide
4-aminobenzomorpholide
4-aminobenzopiperidide
4-amino-2-chloro-N,N-dimethylbenzamide
4-amino-3-chloro-N-butylbenzamide
4-amino-3,5-dichlorobenzamide
4-amino-3,5-dibromobenzanilide
4-amino-2-nitrobenzanilide 4-amino-2-methylbenzomorpholide
5-amino-2-methyl-N-isopropylbenzamide
3-amino-4-methoxy-N,N-dimethylbenzamide
3-amino-2-methylamino-N,N-dimethylbenzamide
3-amino-4-dimethylamino-N,N-dimethylbenzamide
3-acetamino-4-dimethylamino-N,N-dimethylbenzamide
3-aminobenzenesulfonamide
3-amino-6-chloro-N,N-dimethylbenzenesulfonamide
4-aminobenzenesulfonamide
4-aminobenzenesulfonanilide
4-amino-N-butylbenzenesulfonamide
4-aminobenzenesulfon-o-toluidide
4-amino-N-cyclohexylbenzenesulfonamide
4-aminobenzenesulfonmorpholide
4-aminobenzenesulfonpiperidide
4-amino-3-toluenesulfonpiperidide
4-amino-3-toluenesulfonmorpholide
4-amino-3-chloro,N,N-dimethylbenzenesulfonamide
4-amino-2,5-dichloro-N,N-dimethylbenzenesulfonamide
4-amino-2-nitro,N,N-dimethylbenzenesulfonamide
3-amino-6-dimethylamino-N,N-dimethylbenzene-
sulfonamide The detailed preparation of the products of the present invention and preferred products are illustrated by the following specific examples in which the parts are by weight and from which details of the present invention will be apparent to those skilled in the art.

The following examples illustrate the invention:

*Example 1*

42.9 parts of the sodium salt of 1-aminoanthraquinone-9,10-dihydrodisulfuric acid ester are dissolved in 200 parts water and iced to 0° C. 29 parts hydrochloric acid 20° Bé. are now added. The resulting hydrochloride is diazotized by the slow addition of 6.9 parts sodium nitrite as a 31.5% solution. The temperature is maintained below 5° C. by addition of ice. The diazo slurry is run into a solution (at 0°–5° C.) of 36.2 parts of

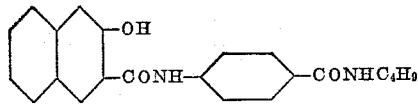

dissolved in 180 parts water and 10 parts caustic soda (30% by wt. soln.), always keeping the coupling alkaline by further addition of caustic soda solution as needed (pH 7.5–9.5). The alkaline solution is agitated for 1 hr. and then salted with sodium chloride in order to precipitate the dyestuff, which is then filtered.

This soluble dyestuff is converted to the pigment by hydrolysis and oxidation as follows: The dye is dissolved in 1500 parts water and heated to 70–80° C. 13 parts sodium nitrite (31.5% soln.) are added. Under rapid agitation, 95 parts hydrochloric acid 20° Bé. are added. Foaming may occur. The slurry is heated to and maintained at 70–90° C. for ½–1 hr. The pigment is isolated by filtering and washing acid free. A red pigment is obtained by the formula:

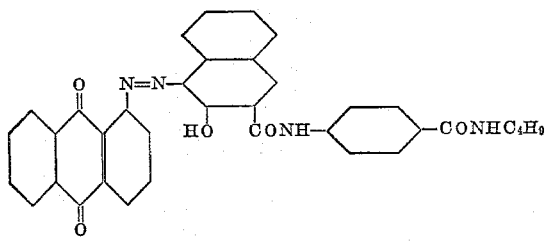

*Example 2*

42.9 parts of the sodium salt of 2-aminoanthraquinone-9,10-dihydrodisulfuric acid ester is diazotized as in Example 1. The diazo slurry is run into a solution (0–5° C.) of 33.4 parts of the naphthol:

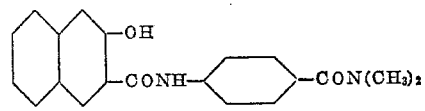

dissolved in 200 parts water and 10 parts caustic soda (30% by wt. soln.), always keeping the coupling alkaline (pH 7.5–9.5) by addition of more caustic soda. The solution is salted with sodium chloride and the dyestuff filtered. On hydrolysis and oxidation, as in Example 1, a red pigment is produced of the formula:

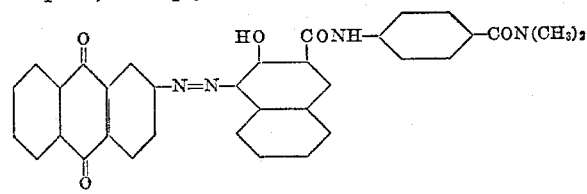

*Example 3*

The diazonium chloride from 46.3 parts 2-amino-3-chloroanthraquinone-9,10-dihydrodisulfuric acid ester sodium salt is prepared as in Example 1. The diazo slurry is run into 34.8 parts (0–5° C.) of:

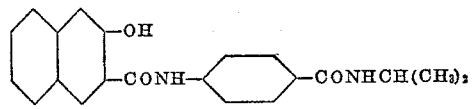

dissolved in 200 parts water and 10 parts caustic soda (30% by wt. soln.) maintaining the coupling alkaline (pH 7.5–9.5) by the addition of caustic as needed. The solution is salted with sodium chloride. After stirring for 1 hr. or longer, the dye is filtered. On hydrolysis and oxidation, as in Example 1, a bright red pigment is produced which has very good light fastness. Its formula is:

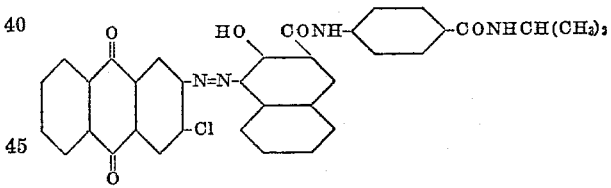

*Example 4*

The diazonium chloride is prepared from 46.3 parts 2-amino-3-chloroanthraquinone - 9,10 - dihydrodisulfuric acid ester disodium salt as in Example 1. The diazo slurry is run into (at 0–5° C.) a solution of 38.2 parts of the coupling component of the formula:

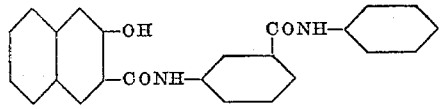

dissolved in 50 parts alcohol, 150 parts water and 10 parts caustic soda (30% by wt. soln.), alkalinity during coupling being maintained at pH 7.5–9.5 by further addition of caustic. The dye is salted and filtered. On hydrolysis and oxidation, as in Example 1, a bright red pigment is obtained having very good light fastness. It has the formula:

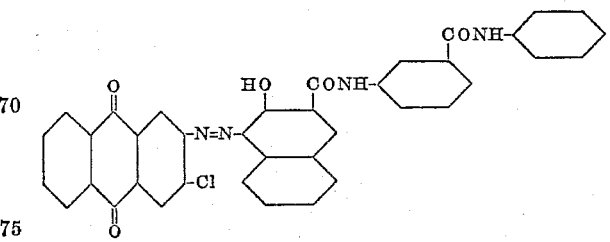

Example 5

The diazonium chloride from 46.3 parts 1-amino-2-chloroanthraquinone-9,10-dihydrodisulfuric acid ester sodium salt is prepared as in Example 1. The diazo is run into a solution (0–5° C.) of 42.4 parts of a compound of the formula:

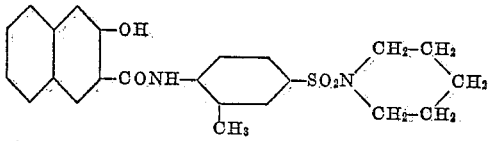

dissolved in 400 parts 30% alcohol solution and 10 parts caustic soda (30% by wt. soln.), the coupling being maintained at pH 7.5–9.5 by further addition of caustic. The dye is salted out and filtered. On hydrolysis and oxidation as in Example 1 an orange pigment is obtained of the formula:

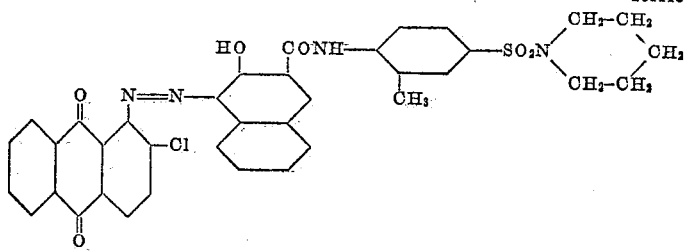

Example 6

The diazonium from 46.3 parts 2-amino-1-chloroanthaquinone19,10-dihydrodisulfuric acid ester sodium salt, prepared as in Example 1, is run into a solution (0–5° C.) of 42.6 parts of the compound:

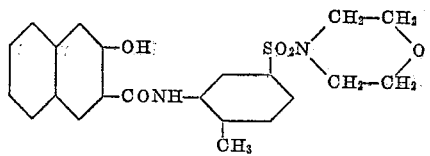

dissolved in 120 parts alcohol, 10 parts caustic soda (30% by vol. soln.) and 200 parts water, always keeping the coupling alkaline. The dye is salted out and filtered. On hydrolysis and oxidation as in Example 1 a red pigment is obtained of the formula:

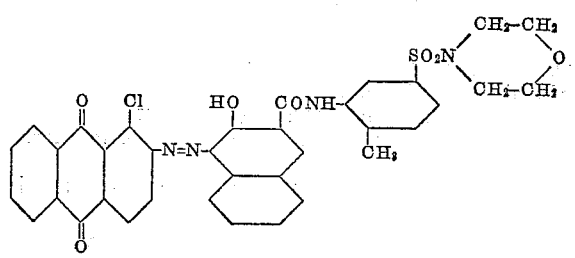

Example 7

The diazonium of Example 4 is run into a solution (0–5° C.) of 37.4 parts of the compound of the formula:

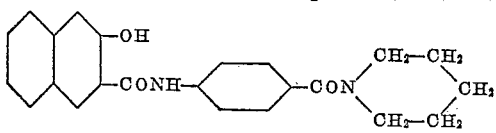

dissolved in 120 parts ethyl alcohol, 10 parts caustic soda (30% by vol. soln.) and 200 parts water, always maintaining an alkalinity of pH 7.5–9.5 by addition of more caustic. The dye is isolated by salting out and filtering. On hydrolysis and oxidation a red pigment is obtained of the formula:

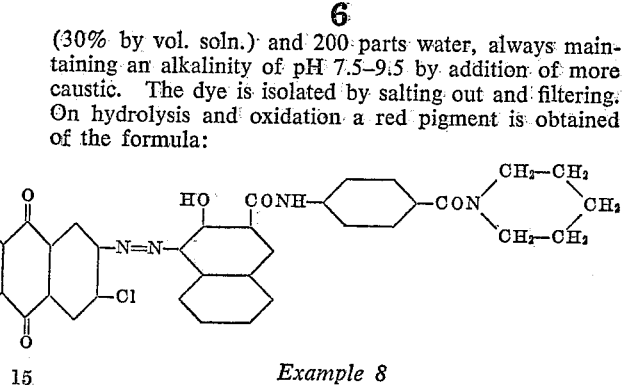

Example 8

35.5 parts of the leuco dye of the formula:

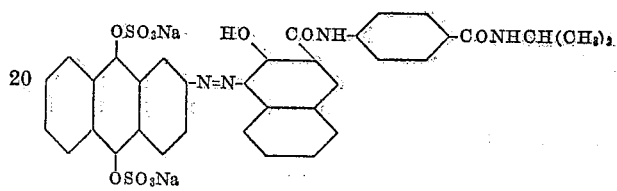

prepared as in Example 2, is dissolved in 1000 parts water. The solution is warmed to 75° C. 22.5 parts ferric chloride as a 30% solution and 52 parts hydrochloric acid 20° Bé. are combined and added to the leuco solution. After heating for 1½ hrs. at 80–85° C., filtering, washing and drying, a red pigment is obtained.

Example 9

Following the procedure used in Example 1, 46.3 parts 1 - amino - 6 - chloroanthraquinone - 9,10 - dihydrodisulfuric acid ester sodium salt are diazotized and coupled with 38.8 parts of the BON of 4-amino-N-cyclohexylbenzamide, and hydrolyzed and oxidized to give a pigment of the formula:

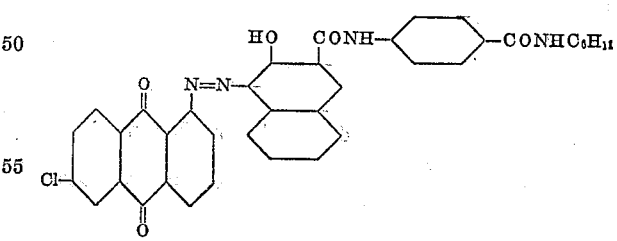

Example 10

Following the procedure used in Example 1, 46.3 parts 2 - amino - 3 - chloroanthraquinone - 9,10 - dihydrodisulfuric acid ester sodium salt are diazotized and coupled with 40.4 parts of the BON of 4-amino-3-chloro-N,N-dimethylbenzenesulfonamide, and hydrolyzed and oxidized to give a pigment of the formula:

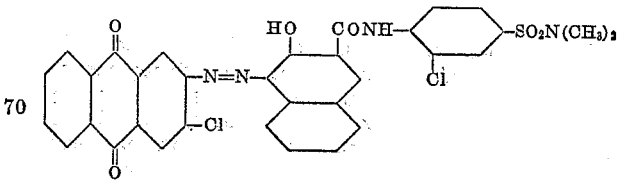

Example 11

Following the procedure used in Example 1, 46.3 parts

2 - amino - 3 - chloroanthraquinone - 9,10 - dihydrodisulfuric acid ester sodium salt are diazotized and coupled with 36.4 parts of the BON of 3-amino-4-methoxy-N,N-dimethylbenzamide, and hydrolyzed and oxidized to give a pigment of the formula:

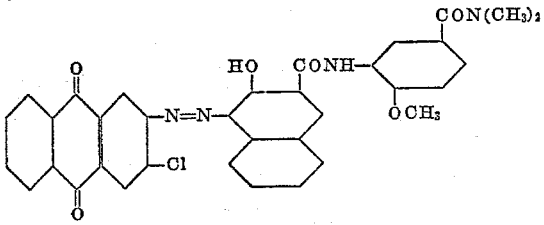

*Example 12*

Following the procedure used in Example 1, 46.3 parts 2 - amino - 3 - chloroanthraquinone - 9,10 - dihydrodisulfuric acid ester sodium salt are diazotized and coupled with 35.1 parts of the BON of 4-amino-2-nitrobenzanilide, and hydrolyzed and oxidized to give a pigment of the formula:

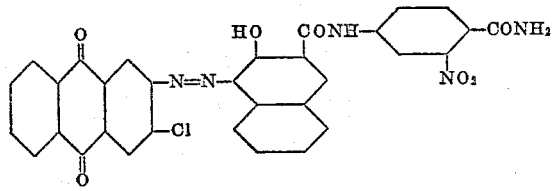

*Example 13*

Example 2 was repeated except that 46.3 parts 2-amino-3-chloroanthraquinone-9,10-dihydrodisulfuric acid ester sodium salt is used to form the diazo. The pigment has the formula:

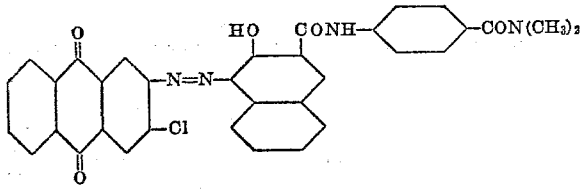

*Example 14*

46.3 parts 2-amino-3-chloroanthraquinone-9,10-dihydro-disulfuric acid ester sodium salt is diazotized and coupled with 34.8 parts of:

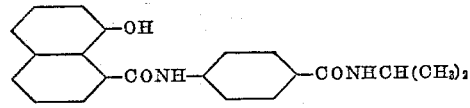

and the solution salted and filtered as in Example 3.

I claim:
1. Insoluble pigments of the anthraquinone-azoic series which have the formula:

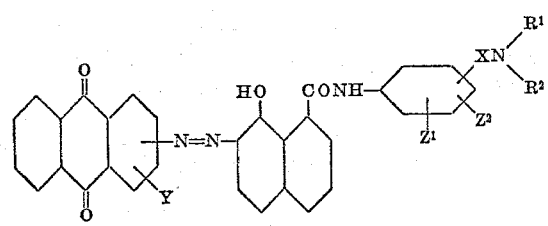

wherein Y represents a member of the group consisting of hydrogen and chlorine, $R^1$ and $R^2$ each represents a member of the group consisting of H, and lower alkyl of 1 to 4 carbons, phenyl and cycloalkyl radicals and $R^1$ and $R^2$ jointly may represent a mononuclear heterocyclic residue; $Z^1$ and $Z^2$ each represent a member of the group consisting of H, chlorine, bromine, nitro, lower alkyl, lower alkoxy, methyl amino and dimethyl amino; and X represents a member of the group consisting of —CO— and —SO$_2$— groups.

2. Insoluble pigments of the anthraquinone-azoic series which have the formula:

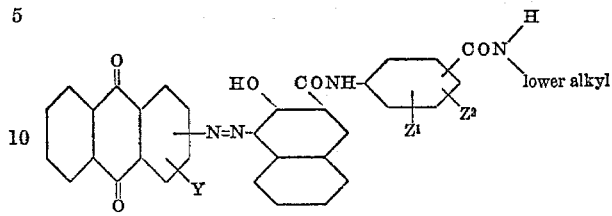

wherein Y represents a member of the group consisting of hydrogen and chlorine; and $Z^1$ and $Z^2$ each represent a member of the group consisting of hydrogen chlorine, bromine, nitro, lower alkyl, lower alkoxy, methyl amino and dimethyl amino.

3. Insoluble pigments of the anthraquinone-azoic series which have the formula:

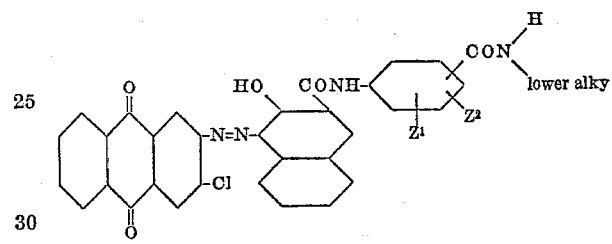

wherein $Z^1$ and $Z^2$ each represent a member of the group consisting of hydrogen, chlorine, bromine, nitro, lower alkyl, lower alkoxy, methyl amino and dimethyl amino.

4. Insoluble pigments of the anthraquinone-azoic series which have the formula:

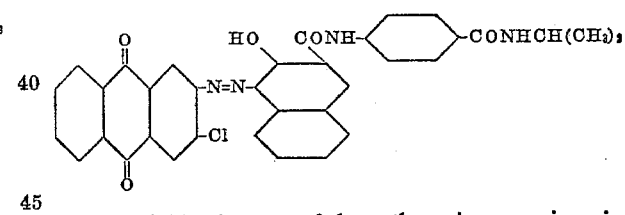

5. Insoluble pigments of the anthraquinone-azoic series which have the formula:

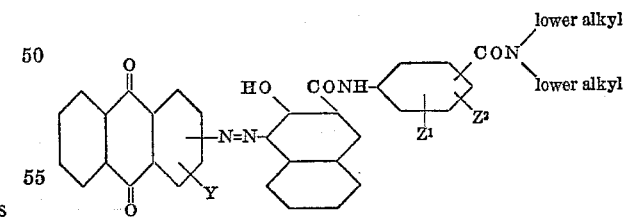

wherein Y represents a member of the group consisting of hydrogen and chlorine; and $Z^1$ and $Z^2$ each represent a member of the group consisting of hydrogen, chlorine, bromine, nitro, lower alkyl, lower alkoxy, methyl amino and dimethyl amino.

6. Insoluble pigments of the anthraquinone-azoic series which have the formula:

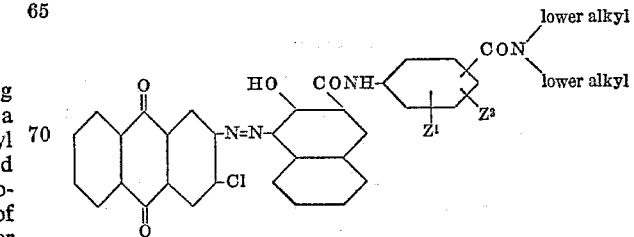

wherein $Z^1$ and $Z^2$ each represent a member of the group consisting of hydrogen, chlorine, bromine, nitro, lower alkyl, lower alkoxy, methyl amino and dimethyl amino.

7. Insoluble pigments of the anthraquinone-azoic series which have the formula:

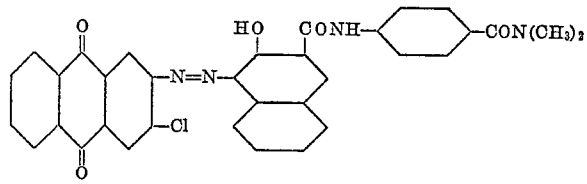

8. Insoluble pigments of the anthraquinone-azoic series which have the formula:

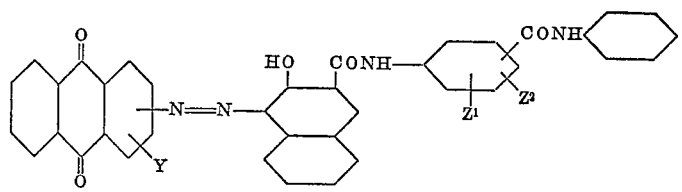

wherein Y represents a member of the group consisting of hydrogen and chlorine; and $Z^1$ and $Z^2$ each represent a member of the group consisting of hydrogen, chlorine, bromine, nitro, lower alkyl, lower alkoxy, methyl amino and dimethyl amino.

9. Insoluble pigments of the anthraquinone-azoic series which have the formula:

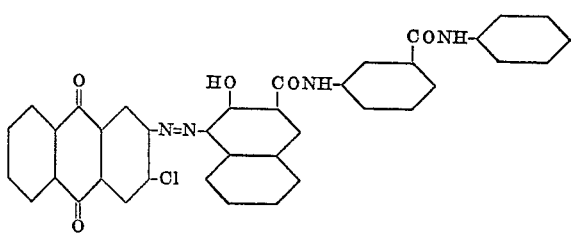

10. Insoluble pigments of the anthraquinone-azoic series which have the formula:

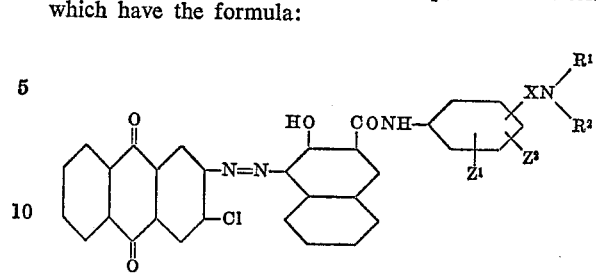

wherein $R^1$ and $R^2$ each represents a member of the group consisting of H, and lower alkyl of 1 to 4 carbons, phenyl and cycloalkyl radicals and $R^1$ and $R^2$ jointly may represent a mononuclear heterocyclic residue; $Z^1$ and $Z^2$ each represent a member of the group consisting of H, chlorine, bromine, nitro, lower alkyl, lower alkoxy, methyl amino and dimethylamino; and X represents a member of the group consisting of —CO— and —SO$_2$— groups.

References Cited in the file of this patent

UNITED STATES PATENTS

| 1,924,774 | Fairweather et al. | Aug. 29, 1933 |
| 2,208,363 | Fischer | July 16, 1940 |